(12) United States Patent
Seo et al.

(10) Patent No.: US 9,791,570 B2
(45) Date of Patent: Oct. 17, 2017

(54) LASER RADAR APPARATUS AND METHOD OF ACQUIRING IMAGE THEREOF

(71) Applicant: ELECTRONICS AND TELECOMMUNICATIONS RESEARCH INSTITUTE, Daejeon (KR)

(72) Inventors: Hong Seok Seo, Daejeon (KR); Bong Ki Mheen, Daejeon (KR); Myoung Sook Oh, Daejeon (KR); Jae Sik Sim, Daejeon (KR); Jung Ho Song, Daejeon (KR); Min Hyup Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 403 days.

(21) Appl. No.: 14/618,230

(22) Filed: Feb. 10, 2015

(65) Prior Publication Data

US 2015/0226853 A1  Aug. 13, 2015

(30) Foreign Application Priority Data

Feb. 12, 2014  (KR) .................. 10-2014-0016065

(51) Int. Cl.
*G01C 3/08* (2006.01)
*G01S 17/89* (2006.01)
*G01S 17/10* (2006.01)
*G01S 7/484* (2006.01)

(52) U.S. Cl.
CPC .............. *G01S 17/89* (2013.01); *G01S 7/484* (2013.01); *G01S 17/10* (2013.01)

(58) Field of Classification Search
CPC .......... G01S 17/89; G01S 17/10; G01S 7/484
USPC ........................................ 356/5.01
See application file for complete search history.

(56) References Cited

U.S. PATENT DOCUMENTS

| 6,720,909 | B1 | 4/2004 | Dedden | |
|---|---|---|---|---|
| 7,116,688 | B2 * | 10/2006 | Sauter | H01S 3/235 372/13 |
| 7,349,454 | B2 * | 3/2008 | Quek | H01S 5/06832 356/5.01 |
| 7,697,125 | B2 * | 4/2010 | Swenson | G01S 7/4812 356/141.5 |
| 2004/0160995 | A1 * | 8/2004 | Sauter | H01S 3/235 372/25 |

(Continued)

FOREIGN PATENT DOCUMENTS

| JP | 2000-075030 A | 3/2000 |
|---|---|---|
| JP | 2012-093195 A | 5/2012 |

(Continued)

*Primary Examiner* — Mark Hellner
(74) *Attorney, Agent, or Firm* — Rabin & Berdo, P.C.

(57) ABSTRACT

Disclosed is a laser radar apparatus. The laser radar apparatus includes: a light transmission unit configured to output a laser pulse by using a light source; a light reception unit configured to receive a reflected laser pulse in connection with the laser pulse; and a controller configured to adjust a repetition rate of the laser pulse of the light source, in which the controller adjusts the repetition rate of the laser pulse based on at least one of reception power, a target distance, a movement speed, a vertical angle, and a radiation angle.

18 Claims, 10 Drawing Sheets

(56) References Cited

U.S. PATENT DOCUMENTS

| | | | | |
|---|---|---|---|---|
| 2008/0278715 | A1* | 11/2008 | Swenson | G01S 7/4812 356/141.5 |
| 2009/0021721 | A1* | 1/2009 | Gogolla | G01S 7/486 356/5.01 |
| 2009/0273770 | A1* | 11/2009 | Bauhahn | G01C 3/08 356/5.01 |
| 2012/0155746 | A1 | 6/2012 | Byun et al. | |
| 2015/0138529 | A1* | 5/2015 | Singer | G01C 15/002 356/4.01 |

FOREIGN PATENT DOCUMENTS

| | | |
|---|---|---|
| JP | 2012-159330 A | 8/2012 |
| KR | 10-2006-0075672 A | 7/2006 |
| KR | 10-0742144 B1 | 7/2007 |
| KR | 10-0834987 B1 | 6/2008 |
| KR | 10-2012-0067098 A | 6/2012 |
| WO | WO 00-79299 A1 | 12/2000 |

\* cited by examiner

LASER RADAR APPARATUS AND METHOD OF ACQUIRING IMAGE THEREOF

CROSS-REFERENCE TO RELATED APPLICATION

This application is based on and claims priority from Korean Patent Application No. 10-2014-0016065, filed on Feb. 12, 2014, with the Korean Intellectual Property Office, the disclosure of which is incorporated herein in its entirety by reference.

BACKGROUND

1. Field

The present invention relates to a laser radar system, and more particularly, to a laser radar apparatus for acquiring an image by using a laser radar light source having a variable pulse repetition rate, and a method of obtaining an image thereof.

2. Discussion of Related Art

A general laser radar system is utilized as an image sensor device for acquiring a 3-dimensional image of an object. The laser radar system is utilized in various fields, such as an industrial robot, a military robot, an autonomous robot, an autonomous vehicle, a structure diagnosis system, and a landslide monitoring system.

The laser radar system adopts a method of outputting light with laser, and receiving the output light and measuring the received light, not a method of acquiring an image from external light. Accordingly, the laser radar system may be used regardless of a surrounding environment, and output an excellent image. Accordingly, a laser light source is used in many fields.

The laser radar may confirm a distance to an object by radiating a laser light source to an object and measuring the light source returned from the object. The laser light source uses a pulse light source and a Continuous Wave (CW) light source. The pulse light source has excellent remote distance measurement performance, and resolution thereof has been improved to a centimeter (cm) level according to technology development. Accordingly, the pulse method is widely utilized to the laser radar system compared to the CW method. In an aspect of the light source, in the pulse method, heat is less generated in the light source compared to the CW method, and a peak output of a pulse may be made be very high, so that the pulse method is advantageous to measure a remote distance. In the case of the CW method, heat is generated in a light source unit in order to make a high output, and an intensity of an output is not high.

Accordingly, the laser radar using the pulse light source may acquire a 3D image by using the pulse light source. To this end, in order to improve efficiency of the laser radar, there is a method of adjusting an output of a pulse light source and adjusting a pulse width.

In this case, the laser radar adjusting an output of the pulse light source adjusts an output of the laser radar when measuring a short distance, so that there is an advantage in that a detector is prevented from being saturated, but has a disadvantage in that it is impossible to rapidly and precisely acquire an image of an object within a short distance.

Further, the laser radar adjusting the pulse width may improve resolution by decreasing a pulse width for an object positioned at a short distance, thereby accurately confirming a position. However, when the pulse width is decreased in the light source unit, there is a disadvantage in that an intensity of the peak of the laser light source may be increased, and the detector may be saturated. Further, the pulse width may be increased for an object positioned at a remote distance. However, when the pulse width is increased, there is a disadvantage in that the peak output of the pulse is decreased, and a signal does not proceed far.

Accordingly, there is necessity for a laser radar apparatus capable of acquiring an image regardless of a distance to an object by efficiently using a laser light source.

SUMMARY

The present invention has been made in an effort to provide a laser radar apparatus capable of acquiring an image regardless of a distance to an object by efficiently using a laser light source, and a method of acquiring an image thereof.

Further, the present invention has been made in an effort to provide a laser radar apparatus capable of acquiring an image by using a laser radar light source having a variable pulse repetition rate, and a method of acquiring an image thereof.

An exemplary embodiment of the present invention provides a laser radar apparatus includes: a light transmission unit configured to output a laser pulse by using a light source; a light reception unit configured to receive a reflected laser pulse in connection with the laser pulse; and a controller configured to adjust a repetition rate of the laser pulse of the light source, in which the controller adjusts the repetition rate of the laser pulse based on at least one of reception power, a target distance, a movement speed, a vertical angle, and a radiation angle.

In the present exemplary embodiment, the controller may change the repetition rate of the laser pulse into one form between a linear change and a non-linear change, and the change may be one of a continuous increase and a continuous decrease.

In the present exemplary embodiment, the controller may change the repetition rate of the laser pulse into one among repetition rates corresponding to a plurality of predetermined stages.

In the present exemplary embodiment, the controller may measure the reception power from the reflected laser pulse, and when the reception power is increased, the controller may increase the repetition rate of the laser pulse, and when the reception power is decreased, the controller decreases the repetition rate of the laser pulse.

In the present exemplary embodiment, the controller may output an initial laser pulse to a target, receive a laser pulse reflected from the target by the initial laser pulse, and measure the target distance.

In the present exemplary embodiment, when the target distance is shorter than a reference distance, the controller may increase the repetition rate of the laser pulse, and when the target distance is longer than the reference distance, the controller may decrease the repetition rate of the laser pulse.

In the present exemplary embodiment, the controller may receive the movement speed of a movement body to which the laser radar apparatus is attached.

In the present exemplary embodiment, when the movement speed is smaller than a reference speed, the controller may increase the repetition rate of the laser pulse, and when the movement speed is larger than the reference speed, the controller may decrease the repetition rate of the laser pulse.

In the present exemplary embodiment, the controller may measure the vertical angle, at which the laser pulse is output, based on a horizontal axis corresponding to a height of a movement body to which the laser radar apparatus is attached.

In the present exemplary embodiment, when the vertical angle is larger than a reference angle, the controller may increase the repetition rate of the laser pulse, and when the vertical angle is smaller than the reference angle, the controller may decrease the repetition rate of the laser pulse.

In the present exemplary embodiment, when the radiation angle, at which the laser pulse is output, is larger than a reference radiation angle, the controller may increase the repetition rate of the laser pulse, and when the radiation angle is larger than the reference radiation angle, the controller may decrease the repetition rate of the laser pulse.

In the present exemplary embodiment, the laser radar apparatus may further include an image acquiring unit configured to reproduce a 3D image by using the reflected laser pulse from the controller.

Another exemplary embodiment of the present invention provides a method of acquiring an image of a laser radar apparatus, including: outputting a laser pulse by using a light source; receiving a reflected laser pulse in connection with the laser pulse; and acquiring an image by using the reflected laser pulse, in which the outputting of the laser pulse includes adjusting a repetition rate of the laser pulse of the light source based on at least one of reception power, a target distance, a movement speed, a vertical angle, and a radiation angle.

In the present exemplary embodiment, the adjusting of the laser pulse may include changing the repetition rate of the laser pulse into one form between a linear change and a non-linear change, and the change may be one of a continuous increase and a continuous decrease.

In the present exemplary embodiment, the adjusting of the laser pulse may include changing the repetition rate of the laser pulse into one among repetition rates corresponding to a plurality of predetermined stages.

In the present exemplary embodiment, the adjusting of the laser pulse may include: measuring the reception power from the reflected laser pulse; and when the reception power is larger than a reference power, increasing the repetition rate of the laser pulse, and when the reception power is smaller than the reference power, decreasing the repetition rate of the laser pulse.

In the present exemplary embodiment, the adjusting of the laser pulse may include: outputting an initial laser pulse to a target; receiving a laser pulse reflected from the target by the initial laser pulse, and measuring the target distance; and when the target distance is shorter than a reference distance, increasing the repetition rate of the laser pulse, and when the target distance is longer than the reference distance, decreasing the repetition rate of the laser pulse.

In the present exemplary embodiment, the adjusting of the laser pulse may include: receiving the movement speed of a movement body to which the laser radar apparatus is attached; and when the movement speed is smaller than a reference speed, increasing the repetition rate of the laser pulse, and when the movement speed is larger than the reference speed, decreasing the repetition rate of the laser pulse.

In the present exemplary embodiment, the adjusting of the laser pulse may include: measuring the vertical angle, at which the laser pulse is output, based on a horizontal axis corresponding to a height of a movement body to which the laser radar apparatus is attached; and when the vertical angle is larger than a reference angle, increasing the repetition rate of the laser pulse, and when the vertical angle is smaller than the reference angle, decreasing the repetition rate of the laser pulse.

In the present exemplary embodiment, the adjusting of the laser pulse may includes, when the radiation angle, at which the laser pulse is output, is larger than a reference radiation angle, increasing the repetition rate of the laser pulse, and when the radiation angle is larger than the reference radiation angle, decreasing the repetition rate of the laser pulse.

According to the exemplary embodiment of the present invention, the laser radar apparatus may acquire an image regardless of a distance to an object through the control of a repetition rate of a laser pulse of a light source. Further, the laser radar apparatus may acquire an optimum image by controlling a repetition rate of a laser pulse considering various environments, for example, various conditions and situations, such as a reception environment, a movement environment, an installation position, a light source characteristic.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which.

DETAILED DESCRIPTION

Hereinafter, an embodiment of the present invention will be described with reference to the accompanying drawings in detail. However, the present invention is not limited to an embodiment disclosed below and may be implemented in various forms and the scope of the present invention is not limited to the following embodiments. Rather, the embodiment is provided to more sincerely and fully disclose the present invention and to completely transfer the spirit of the present invention to those skilled in the art to which the present invention pertains, and the scope of the present invention should be understood by the claims of the present invention.

A laser radar apparatus of the present invention changes a repetition rate of a laser according to a distance by using a characteristic that when the repetition rate of a pulse is increased, an output of a pulse is decreased, and when the repetition rate of a pulse is decreased, an output of a pulse is increased. Accordingly, the laser radar apparatus may improve efficiency of a pulse light source, and improve performance of a system by using the laser radar apparatus. Accordingly, various types of light sources may be used as a light source suggested in the present invention. A light source adopting a scheme of a semiconductor Laser Diode (LD) array and an optical fiber Master Oscillator Power Amplifier (MOPA) may be used.

Figure 1:
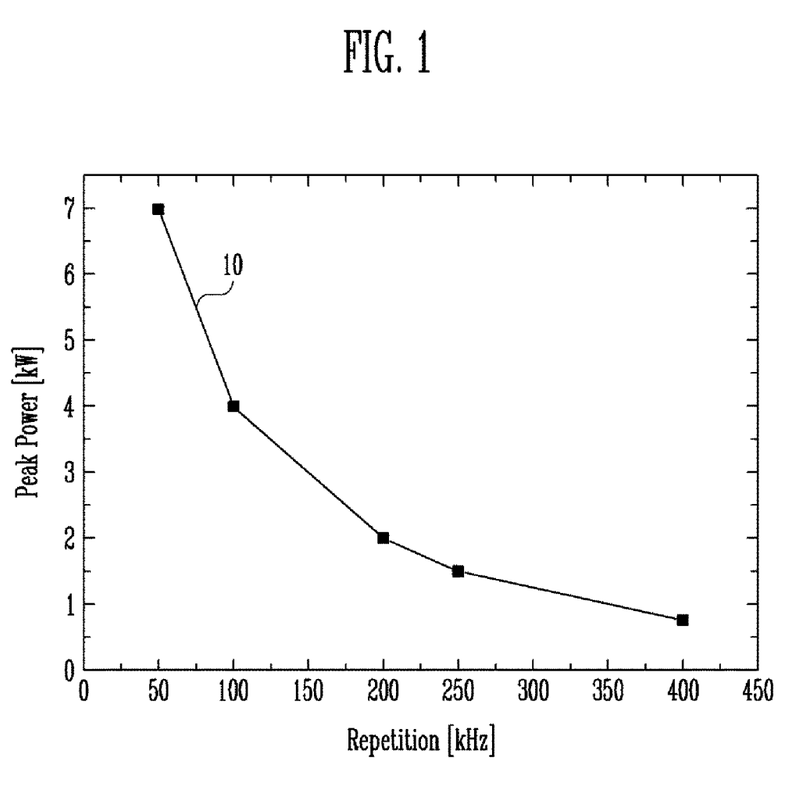
FIG. 1 is a diagram illustrating an optical property according to a repetition rate in an optical fiber laser pulse based on an MOPA according to an exemplary embodiment of the present invention.

FIG. 1 is a diagram illustrating an optical property according to a repetition rate in an optical fiber laser pulse based on an MOPA according to an exemplary embodiment of the present invention.

Referring to FIG. 1, a horizontal axis of a graph indicates a repetition rate (KHz), and a vertical axis of the graph indicates peak power (kW).

An optical property 10 of an optical fiber laser pulse based on the MOPA is illustrated in FIG. 1. To this end, a laser pulse is generated by using a Distributed Feedback (DFB) laser having a beam quality and a monochromatic property. Further, the generated laser pulse is used as the optical fiber laser pulse based on the MOPA by multi-stage amplifying the generated laser pulse by using an optical fiber amplifier and increasing peak power to a level of kW.

The optical fiber laser pulse based on the MOPA has a monochromatic property, an ultra short pulse, and a single mode characteristic, like DFB laser. Further, the optical fiber laser pulse based on the MOPA may change a laser property by adjusting a pulse width and a repetition rate.

When a repetition rate of the optical fiber laser pulse based on the MOPA is increased, the number of pulses per unit time is increased. Accordingly, the pulses share energy inside the amplifier, so that peak power of the pulse is decreased. That is, it can be seen that when the repetition rate is increased like the optical property 10 illustrated in FIG. 1, the peak power of the pulse is decreased in a form of a function of about 1/x.

Figure 2:
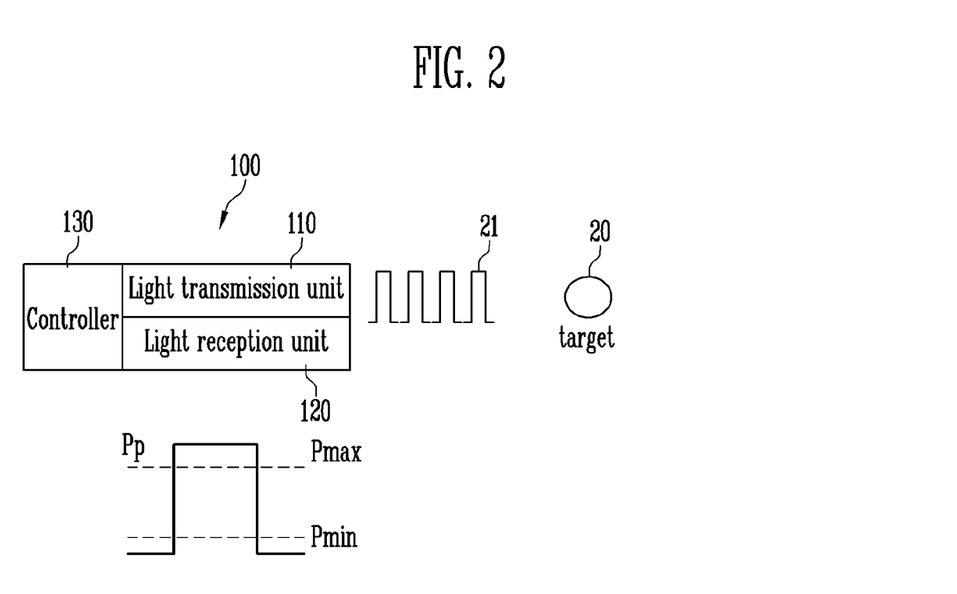
FIG. 2 is a diagram illustrating short distance measurement in a laser radar apparatus, which changes a repetition rate, according to the exemplary embodiment of the present invention.

FIG. 2 is a diagram illustrating short distance measurement in the laser radar apparatus, which changes the repetition rate, according to the exemplary embodiment of the present invention.

Referring to FIG. 2, the laser radar apparatus 100 includes a light transmission unit 110, a light reception unit 120, and a controller 130.

The light transmission unit 110 includes a laser pulse light source, and outputs a laser pulse.

The light reception unit 120 receives a reflected laser pulse reflected and returning from the laser pulse output from the light transmission unit 110.

The controller 130 may change the repetition rate of the laser pulse light source through a control of the light transmission unit 110 according to power of the reflected laser pulse received through the light reception unit 120.

An operation of the laser radar apparatus 100 will be described with reference to FIG. 2.

First, the light transmission unit 110 may output a laser pulse 21 having peak power of several tens to several hundreds of kWp at a low repetition rate. However, the output laser pulse may reach an object 20 (or an object having high reflectance) positioned at a short distance and return. In this case, the light reception unit 120 may be saturated by an intensity of the high reflected laser pulse.

To this end, the output of the laser pulse light source from the light transmission unit 110 may be decreased, but in the present invention, the laser radar apparatus 100 may change the repetition rate of the laser pulse under the control of the controller 130 to decrease the peak output of the laser pulse. Thus, the light reception unit 120 may effectively detect the laser pulse with the lowered peak power. When the controller 130 increases the repetition rate of the laser pulse, the laser radar apparatus 100 may implement a 3D image with high resolution. Further, the laser radar apparatus 100 may implement a high-speed 3D image by increasing a frame rate at the same resolution.

Figure 3:
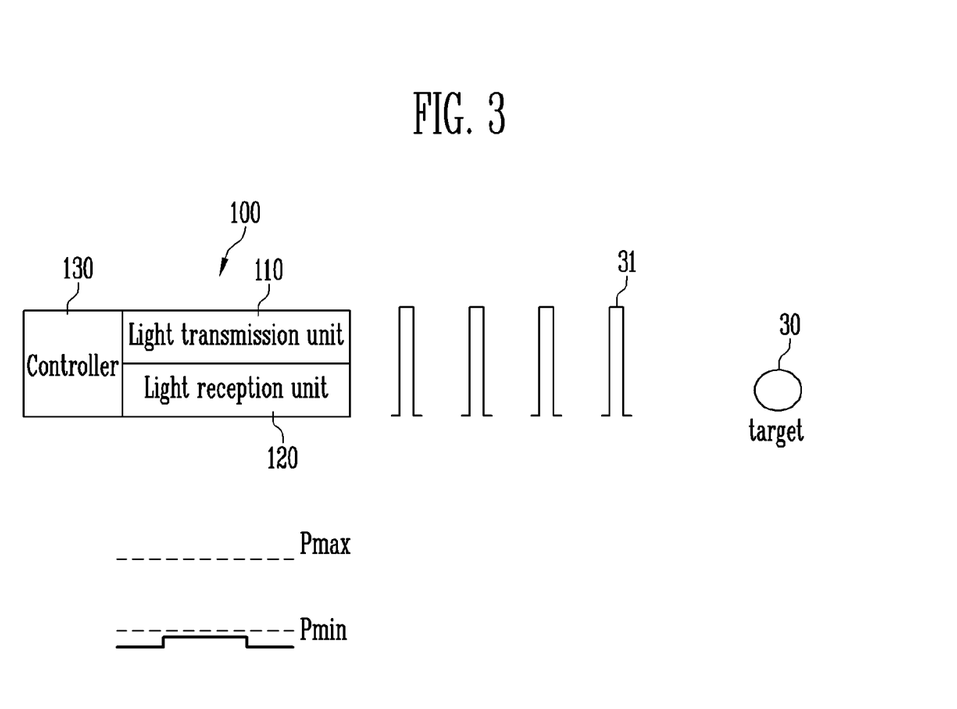
FIG. 3 is a diagram illustrating remote distance measurement in a laser radar apparatus, which changes a repetition rate, according to the exemplary embodiment of the present invention.

FIG. 3 is a diagram illustrating remote distance measurement in the laser radar apparatus, which changes a repetition rate, according to the exemplary embodiment of the present invention.

Referring to FIG. 3, the laser radar apparatus 100 includes the light transmission unit 110, the light reception unit 120, and the controller 130, and the detailed description of the laser radar apparatus will be referred to the description of FIG. 2.

The light transmission unit 110 outputs laser light.

The light reception unit 120 receives light reflected from an object 30 (or an object having low reflectance) positioned at a remote distance. In this case, when the laser pulse received in the light reception unit 120 has a decreased output compared to the laser pulse output from the light transmission unit 110 to be excessively small, the laser pulse may be recognized as noise. In this case, the laser radar apparatus 100 may improve the peak output of the laser by decreasing a repetition rate of the laser pulse under the control of the controller 130. Accordingly, the light reception unit 120 may obtain a noise free signal by obtaining a proper received reception power of the laser pulse.

When the repetition rate of the laser pulse is decreased, the laser radar apparatus 100 implements a 3D image with low resolution, or implement an image at a low speed. The laser radar apparatus 100 may be mainly used for remote distance measurement. Accordingly, the laser radar apparatus 100 may efficiently implement an image with low resolution by using the laser pulse having a low repetition rate.

Figure 4A:
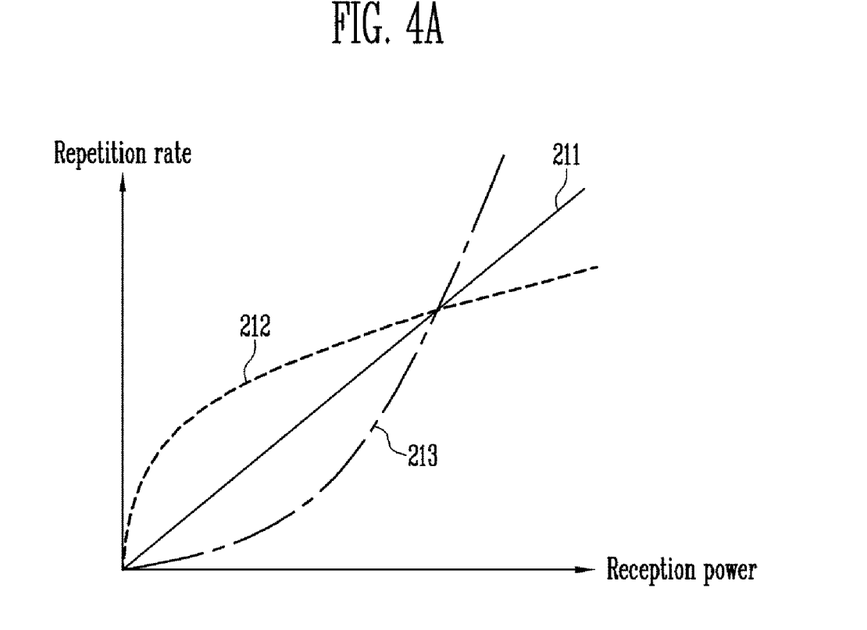
FIG. 4A is a graph illustrating a repetition rate, which is gradually changed according to reception power, in the laser radar apparatus according to the exemplary embodiment of the present invention.

FIG. 4A is a graph illustrating a repetition rate, which is gradually changed according to reception power, in the laser radar apparatus according to the exemplary embodiment of the present invention.

Referring to FIG. 4A, a horizontal axis of the graph indicates a received power of laser pulse, and a vertical axis thereof indicates a repetition rate.

When an intensity of a received power in the light reception unit 120 is increased (or is larger than a reference reception power), the laser radar apparatus 100 may decrease the reception power by increasing the repetition rate of the laser pulse. Unlikely, when an intensity of a power received in the light reception unit 120 is decreased (or is smaller than a reference reception power), the laser radar apparatus 100 may increase the reception power by decreasing the repetition rate of the laser pulse.

Accordingly, the controller 130 may adjust the repetition rate of the laser pulse of the light transmission unit 110 based on the intensity of the power received in the light reception unit 120. When the intensity of the received power of a laser pulse is increased, the controller 130 controls the light transmission unit 110 so that the repetition rate of the output laser pulse is linearly increased 211, or controls the light transmission unit 110 so that the repetition rate of the output laser pulse is non-linearly increased 212 and 213.

Figure 4B:
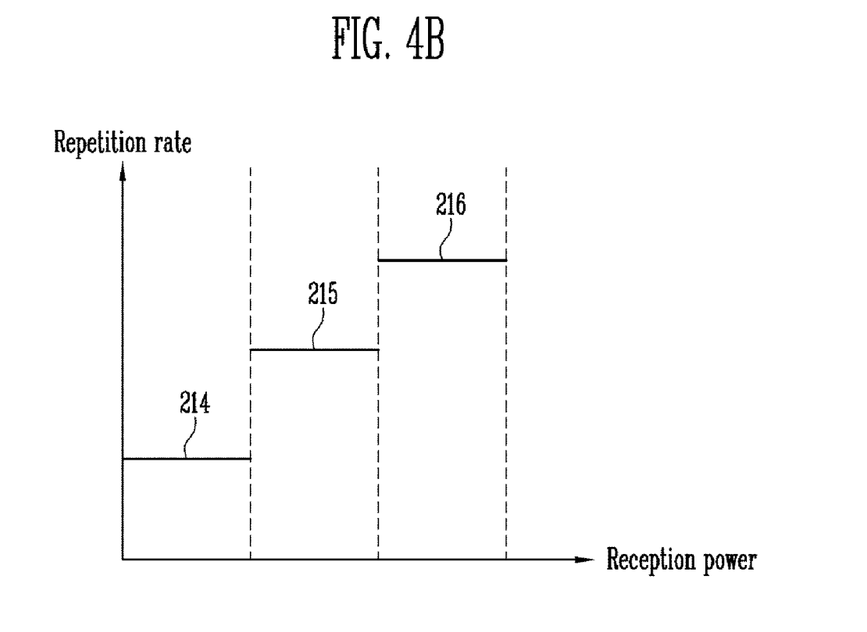
FIG. 4B is a graph illustrating a repetition rate, which is changed in stage according to reception power, in the laser radar apparatus according to the exemplary embodiment of the present invention.

FIG. 4B is a graph illustrating a repetition rate, which is changed in stage according to received power, in the laser radar apparatus according to the exemplary embodiment of the present invention.

Referring to FIG. 4B, a horizontal axis of the graph indicates a received reception power of a laser pulse, and a vertical axis thereof indicates a repetition rate.

The controller 130 adjusts the repetition rate of the laser pulse of the light transmission unit 110 based on the intensity of the power received in the light reception unit 120. When the intensity of the received reception power of the laser pulse is increased, the controller 130 controls the light transmission unit 110 so that the repetition rate of the laser pulse is increased in stage (a first stage 214, a second stage 215, and a third stage 216) whenever the intensity of the reception power (or a reception power intensity section) exceeds reference power based on predetermined reference power. Here, a repetition rate of the second stage 215 is higher than a repetition rate of the first stage 214, and a repetition rate of the third stage 216 is higher than the repetition rate of the second stage 215.

A method of increasing the repetition rate of the laser pulse by the controller illustrated in FIG. 4B may decrease a load of a system compared to a method of increasing the repetition rate of the laser pulse illustrated in FIG. 4A.

Figure 5A:
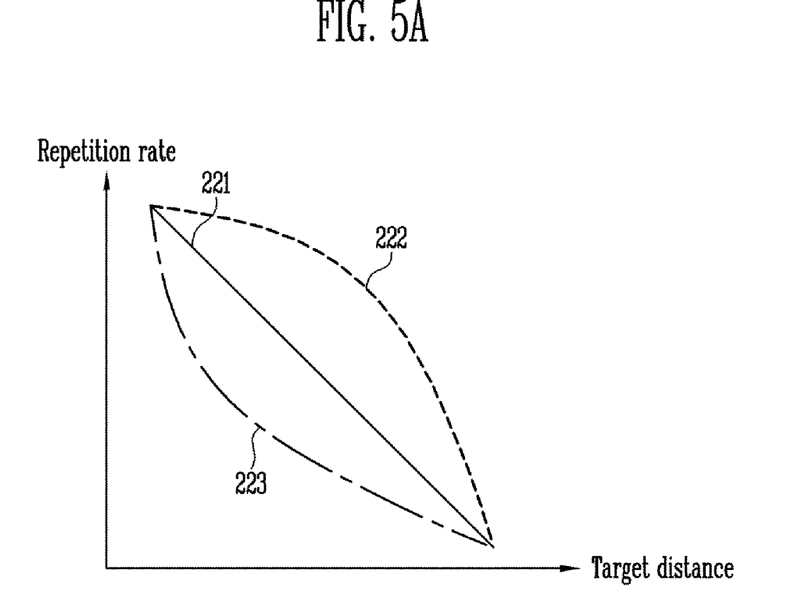
FIG. 5A is a graph illustrating a repetition rate, which is gradually changed according to a distance to a target, in the laser radar apparatus according to the exemplary embodiment of the present invention.

FIG. 5A is a graph illustrating a repetition rate, which is gradually changed according to a distance to a target, in the laser radar apparatus according to the exemplary embodiment of the present invention.

Referring to FIG. 5A, a horizontal axis of the graph indicates a target distance, which is a distance to a target, and a vertical axis thereof indicates a repetition rate.

The controller 130 may output an initial laser pulse through the light transmission unit 110, and receive a signal corresponding to the initial laser pulse through the light reception unit 120. Accordingly, the controller 130 may measure a target distance to the object.

In this case, the controller 130 may measure the target distance, which is the distance to the target, based on data obtained at the initial operation. Accordingly, when the distance to the target is shorter than a reference distance, the controller 130 controls the light transmission unit 110 to increase the repetition rate of the output laser pulse. Unlikely, when the distance to the target is longer than the reference distance, the controller 130 controls the light transmission unit 110 to decrease the repetition rate of the output laser pulse.

In the meantime, in FIG. 5A, the controller 130 controls the light transmission unit 110 so that the repetition rate of the laser pulse is linearly decreased 221 or non-linearly decreased 222 and 223 as the distance to the target becomes longer than the reference distance.

Figure 5B:
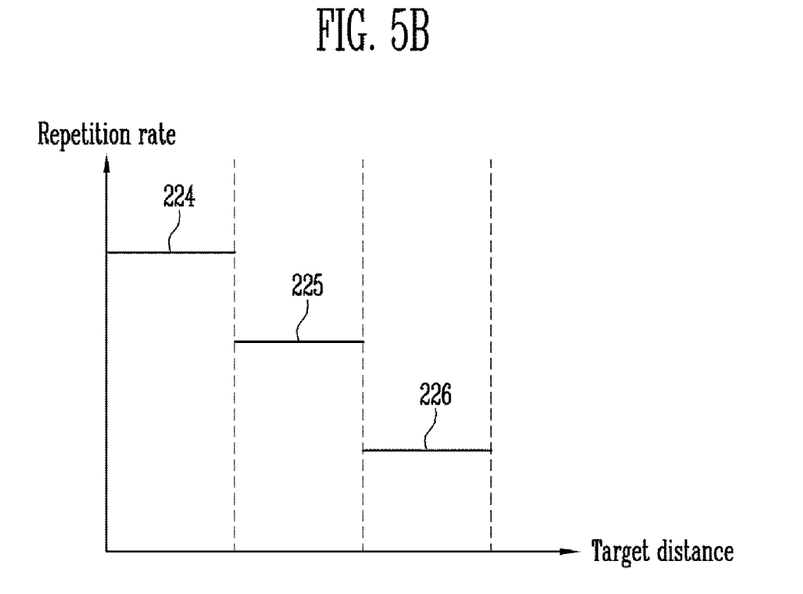
FIG. 5B is a graph illustrating a repetition rate, which is changed in stage according to a distance to a target, in the laser radar apparatus according to the exemplary embodiment of the present invention.

FIG. 5B is a graph illustrating a repetition rate, which is changed in stage according to a distance to a target object, in the laser radar apparatus according to the exemplary embodiment of the present invention.

Referring to FIG. 5B, a horizontal axis of the graph indicates a target distance, which is a distance to a target, and a vertical axis thereof indicates a repetition rate.

The controller 130 controls the light transmission unit 110 so that the repetition rate of the laser pulse is decreased in stage as the distance to the target becomes longer than the reference distance. A repetition rate of the second stage 225 is smaller than a repetition rate of the first stage 224, and a repetition rate of the third stage 226 is smaller than the repetition rate of the second stage 225. Accordingly, the controller 130 controls the light transmission unit 110 to output the laser pulse having the repetition rate corresponding to one stage among the first stage 224 to the third stage 226 according to the distance (or distance section) to the target.

Figure 6:
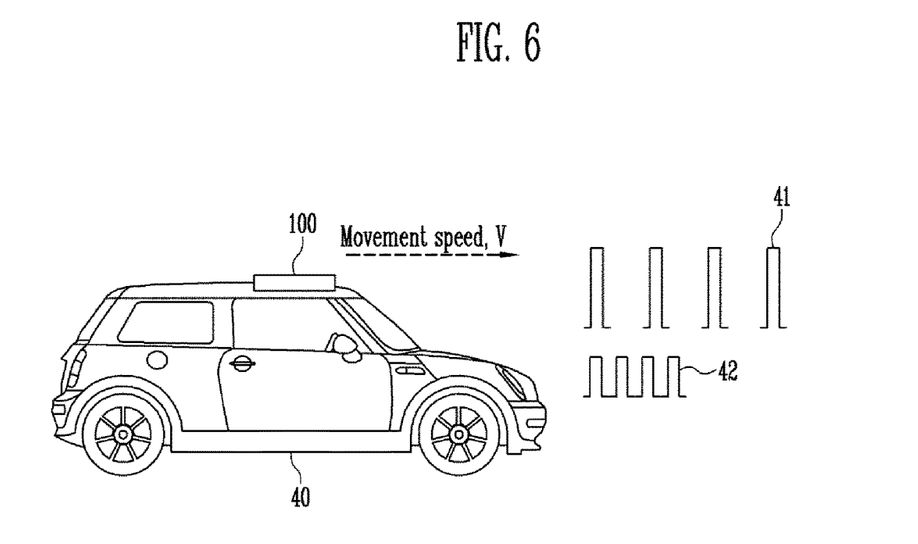
FIG. 6 is a diagram illustrating the laser radar apparatus with which a moving movement body is combined according to the exemplary embodiment of the present invention.

FIG. 6 is a diagram illustrating the laser radar apparatus with which a moving movement body is combined according to the exemplary embodiment of the present invention.

Referring to FIG. 6, the laser radar apparatus 100 may be mounted in a moving movement body 40, for example, a vehicle. The laser radar apparatus 100 may receive speed information about the movement body 40 from the movement body (for example, a speedometer in the case of the vehicle) or a Global Positioning System (GPS) device.

In this case, the laser radar apparatus 100 may change a repetition rate of a laser pulse according to the movement speed of the moving body 40. Accordingly, the laser radar apparatus 100 may improve efficiency in implementation of a 3D image.

When the received movement speed is higher than a reference speed, the laser radar apparatus 100 implements a remote image, rather than an image of a surrounding area, by decreasing 41 the repetition rate of the laser pulse. Unlikely, when the received movement speed is lower than a reference speed, the laser radar apparatus 100 implements an image of a surrounding area rapidly or with high resolution by increasing 42 the repetition rate of the laser pulse.

Figure 7A:
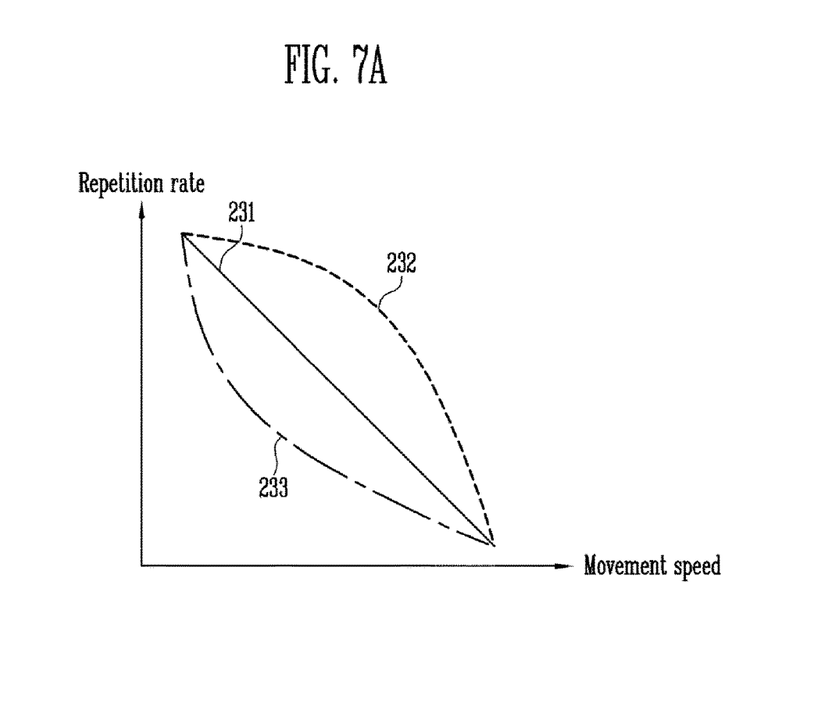
FIG. 7A is a graph illustrating a repetition rate, which is gradually changed according to a movement speed, in the laser radar apparatus according to the exemplary embodiment of the present invention.

FIG. 7A is a graph illustrating a repetition rate, which is gradually changed according to a movement speed, in the laser radar apparatus according to the exemplary embodiment of the present invention.

Referring to FIG. 7A, a horizontal axis of the graph indicates a movement speed of the moving body 40, and a vertical axis thereof indicates a repetition rate.

The controller 130 of the laser radar apparatus 100 receives the movement speed of the moving body 40. As the received movement speed of the movement body 40 is higher than the reference speed, the controller 130 controls the light transmission unit 110 so that the repetition rate of the laser pulse is linearly decreased 231 or non-linearly decreased 232 and 233.

Figure 7B:
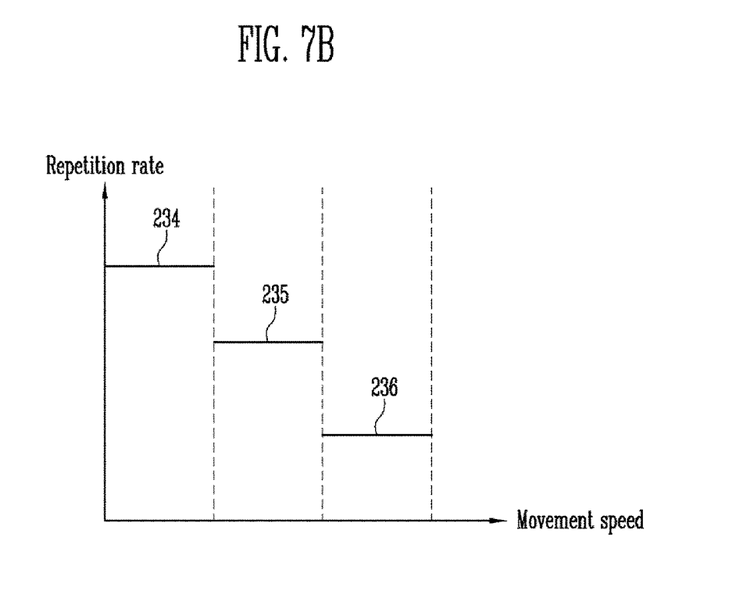
FIG. 7B is a graph illustrating a repetition rate, which is changed in stage according to a movement speed, in the laser radar apparatus according to the exemplary embodiment of the present invention.

FIG. 7B is a graph illustrating a repetition rate, which is changed in stage according to a movement speed, in the laser radar apparatus according to the exemplary embodiment of the present invention.

Referring to FIG. 7B, a horizontal axis of the graph indicates a movement speed of the moving body 40, and a vertical axis thereof indicates a repetition rate.

The controller 130 of the laser radar apparatus 100 receives the movement speed of the moving body 40. As the received movement speed of the movement body 40 is higher than the reference speed, the controller 130 controls the light transmission unit 110 so that the repetition rate of the laser pulse is decreased in stage. Here, a repetition rate of the second stage 235 is lower than a repetition rate of the first stage 234, and a repetition rate of the third stage 236 is higher than the repetition rate of the second stage 235. Accordingly, the controller 130 controls the light transmission unit 110 to output the laser pulse having the repetition rate corresponding to one stage among the first stage 234 to the third stage 236 according to the movement speed (or movement speed section) of the movement body 40.

Figure 8:
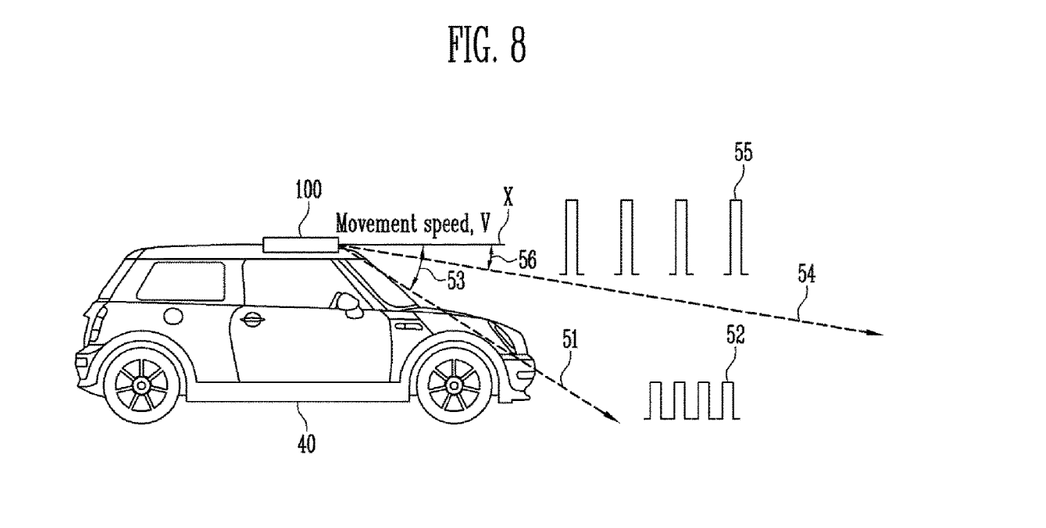
FIG. 8 is a diagram illustrating the laser radar apparatus which changes a repetition rate according to a transmission angle of a laser pulse according to the exemplary embodiment of the present invention.

FIG. 8 is a diagram illustrating the laser radar apparatus which changes a repetition rate according to a transmission angle of a laser pulse according to the exemplary embodiment of the present invention.

Referring to FIG. 8, the laser radar apparatus 100 may be mounted in a moving movement body 40, for example, a vehicle. The laser radar apparatus 100 may measure a transmission angle of the laser pulse through an internal signal or the movement body 40.

Accordingly, when a transmission direction (or reception direction) 51 of the laser pulse heads a ground surface close to the movement body 40, the laser radar apparatus 100 sets the repetition rate of the laser pulse to be increased 52. Here, the transmission direction 51 of the laser pulse forms a first vertical angle 53 based on a horizontal axis X with respect to the movement direction.

Unlikely, when a transmission direction (or reception direction) 54 of the laser pulse heads a ground surface far from the movement body 40, the laser radar apparatus 100 sets the repetition rate of the laser pulse to be decreased 55. Here, the transmission direction 54 of the laser pulse forms a second vertical angle 56 based on the horizontal axis X with respect to the movement direction. For reference, the second vertical angle 56 has a smaller value than that of the first vertical angle 53.

Accordingly, the laser radar apparatus 100 may improve efficiency in implementing a 3D image by measuring a vertical angle and controlling the repetition rate of the laser pulse according to the measured vertical angle.

When the transmission direction of the laser pulse heads a ground surface close to the movement body 40, a position of a surrounding object is mainly recognized. Accordingly, the laser radar apparatus 100 may implement a 3D image with high resolution by increasing the repetition rate of the laser pulse, or implement a high-speed 3D image having a high frame rate at lower resolution.

Unlikely, when the transmission direction of the laser pulse heads a ground surface far from the movement body 40, a position of an object located at a remote distance is recognized. Accordingly the laser radar apparatus 100 implements a 3D image of the object, which is located at a remote distance, having no noise by decreasing the repetition rate of the laser pulse.

Figure 9A:
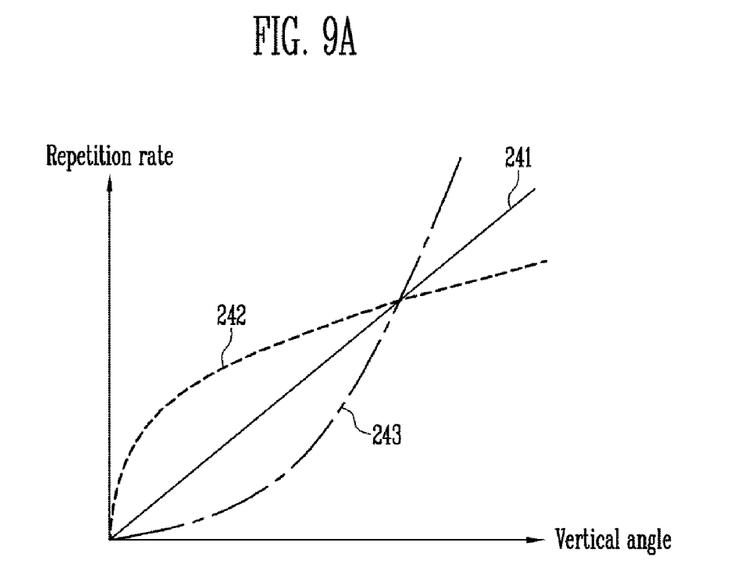
FIG. 9A is a graph illustrating a repetition rate, which is gradually changed according to a vertical angle, in the laser radar apparatus according to the exemplary embodiment of the present invention.

FIG. 9A is a graph illustrating a repetition rate, which is gradually changed according to a vertical angle, in the laser radar apparatus according to the exemplary embodiment of the present invention.

Referring to FIG. 9A, a horizontal axis of the graph indicates a vertical angle (for example, a vertical angle in a down direction) based on a horizontal axis X corresponding to a height of the movement body 40 to which the laser radar apparatus 100 is attached, and a vertical axis indicates a repetition rate.

The laser radar apparatus 100 may obtain a vertical angle through an internal signal or the movement body 40.

In this case, the laser radar apparatus 100 may change a repetition rate of a laser pulse according to the vertical angle. Accordingly, the laser radar apparatus 100 may improve efficiency in implementation of a 3D image.

When the vertical angle is larger than a reference angle, the laser radar apparatus 100 implements an image of a surrounding area rapidly or with high resolution by increasing 52 the repetition rate of the laser pulse. Unlikely, when the vertical angle is smaller than the reference angle, the laser radar apparatus 100 implements an image of an object located at a remote distance without a noise by decreasing 55 the repetition rate of the laser pulse.

The controller 130 of the laser radar apparatus 100 measures the vertical angle based on the transmission direction of the laser pulse. The controller 130 controls the light transmission unit 110 so that the repetition rate of the output laser pulse is linearly increased 241 or non-linearly increased 242 and 243 as the vertical angle is larger than the reference angle.

Figure 9B:
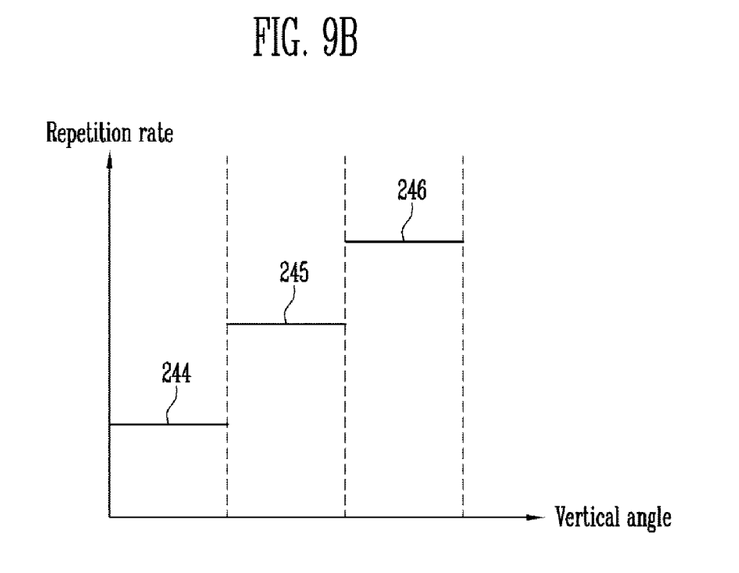
FIG. 9B is a graph illustrating a repetition rate, which is changed in stage according to a vertical angle, in the laser radar apparatus according to the exemplary embodiment of the present invention.

FIG. 9B is a graph illustrating a repetition rate, which is changed in stage according to a vertical angle, in the laser radar apparatus according to the exemplary embodiment of the present invention.

Referring to FIG. 9B, a horizontal axis of the graph indicates a vertical angle based on a horizontal axis X, and a vertical axis indicates a repetition rate.

The controller 130 of the laser radar apparatus 100 measures the vertical angle based on the transmission direction of the laser pulse. The controller 130 controls the light transmission unit 110 so that the repetition rate of the laser pulse is increased in stage as the measured vertical angle is larger than the reference angle. Here, a repetition rate of the second stage 244 is higher than a repetition rate of the first stage 245, and a repetition rate of the third stage 245 is higher than the repetition rate of the second stage 246. Accordingly, the controller 130 controls the light transmission unit 110 to output the laser pulse having the repetition rate corresponding to one stage among the first stage 244 to the third stage 246 according to the vertical angle (or vertical angle section) of the laser pulse.

Figure 10:
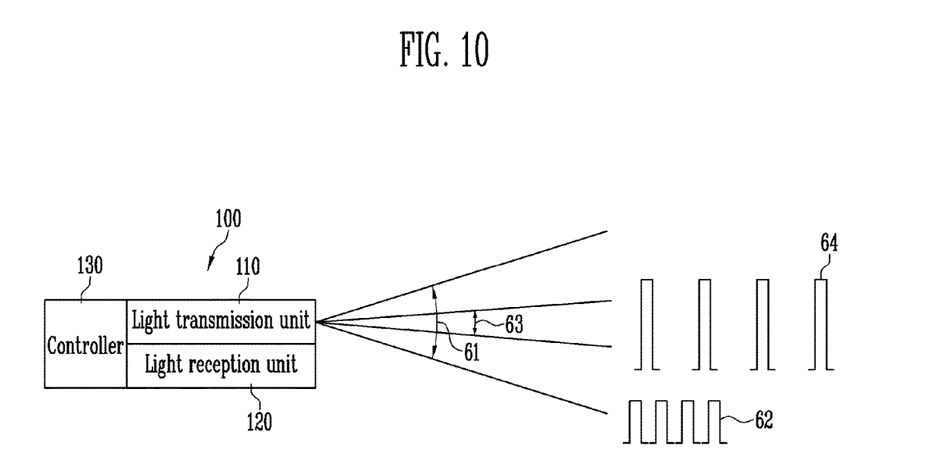
FIG. 10 is a diagram illustrating the laser radar apparatus which changes a repetition rate according to a beam radiation angle of a laser pulse according to the exemplary embodiment of the present invention.

FIG. 10 is a diagram illustrating the laser radar apparatus which changes a repetition rate according to a beam radiation angle of a laser pulse according to the exemplary embodiment of the present invention.

Referring to FIG. 10, the laser radar apparatus 100 may store or obtain a beam radiation angle therein. Here, the beam radiation angle means an angle at which the beam is radiated, and may be a function for a distance to a target or a movement speed of the movement body, to which the laser radar apparatus 100 is mounted. Here, the radiation angle of the laser pulse is formed based on an output direction of the laser pulse.

Accordingly, when a radiation angle 61 of the laser pulse is larger than a reference radiation angle, the laser radar apparatus 100 sets the repetition rate of the laser pulse to be increased 62.

Unlikely, when a radiation angle 63 of the laser pulse is smaller than the reference radiation angle, the laser radar apparatus 100 sets the repetition rate of the laser pulse to be decreased 64.

Accordingly, the laser radar apparatus 100 may improve efficiency in implementation of a 3D image by controlling the repetition rate of the laser pulse based on the radiation angle.

Figure 11A:
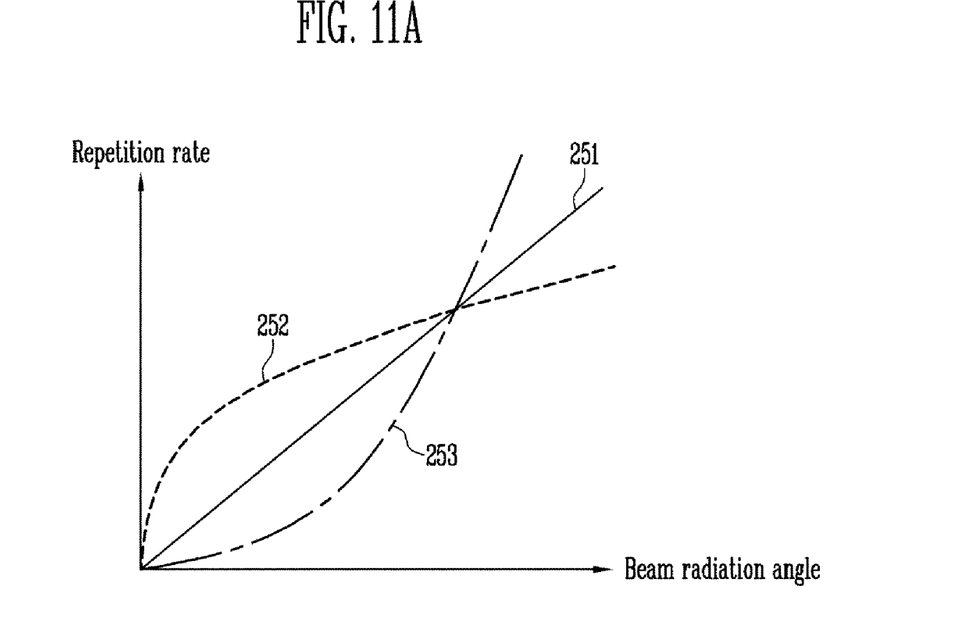
FIG. 11A is a graph illustrating a repetition rate, which is gradually changed according to a radiation angle, in the laser radar apparatus according to the exemplary embodiment of the present invention.

FIG. 11A is a graph illustrating a repetition rate, which is gradually changed according to a radiation angle, in the laser radar apparatus according to the exemplary embodiment of the present invention.

Referring to FIG. 11A, a horizontal axis of the graph indicates a radiation angle, and a vertical axis thereof indicates a repetition rate.

The laser radar apparatus 100 may change a repetition rate of a laser pulse according to a radiation angle. Accordingly, the laser radar apparatus 100 may improve efficiency in implementation of a 3D image.

When the radiation angle is larger than a reference radiation angle, the laser radar apparatus 100 implements an image of a surrounding area rapidly or with high resolution by increasing 62 the repetition rate of the laser pulse. Unlikely, when the radiation angle is smaller than the reference radiation angle, the laser radar apparatus 100 implements an image of an object without a noise by decreasing 64 the repetition rate of the laser pulse.

The controller 130 of the laser radar apparatus 100 uses the radiation angle of the laser pulse. The controller 130 controls the light transmission unit 110 so that the repetition rate of the output laser pulse is linearly increased 251 or non-linearly increased 252 and 253 as the radiation angle is larger than the reference radiation angle.

Figure 11B:
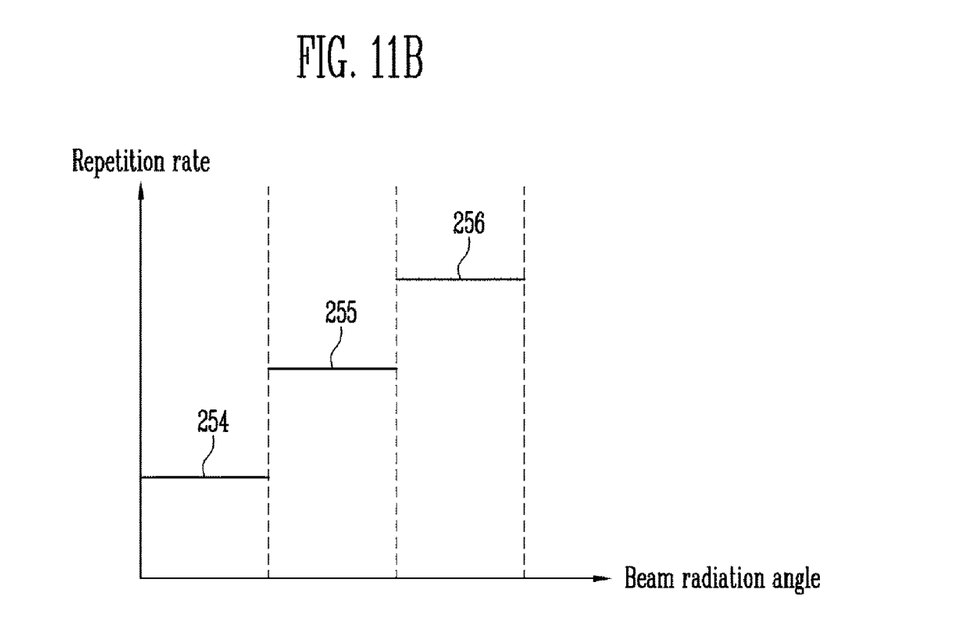
FIG. 11B is a graph illustrating a repetition rate, which is changed in stage according to a radiation angle, in the laser radar apparatus according to the exemplary embodiment of the present invention.

FIG. 11B is a graph illustrating a repetition rate, which is changed in stage according to a radiation angle, in the laser radar apparatus according to the exemplary embodiment of the present invention.

Referring to FIG. 11B, a horizontal axis of the graph indicates a radiation angle, and a vertical axis thereof indicates a repetition rate.

The controller 130 of the laser radar apparatus 100 uses the radiation angle of the laser pulse. The controller 130 controls the light transmission unit 110 so that the repetition rate of the laser pulse is increased in stage as the radiation angle is larger than the reference radiation angle. Here, a repetition rate of the second stage 254 is higher than a repetition rate of the first stage 255, and a repetition rate of the third stage 255 is higher than the repetition rate of the second stage 256. Accordingly, the controller 130 controls the light transmission unit 110 to output the laser pulse having the repetition rate corresponding to one stage among the first stage 244 to the third stage 246 according to the radiation angle (or radiation angle section) of the laser pulse.

Figure 12:
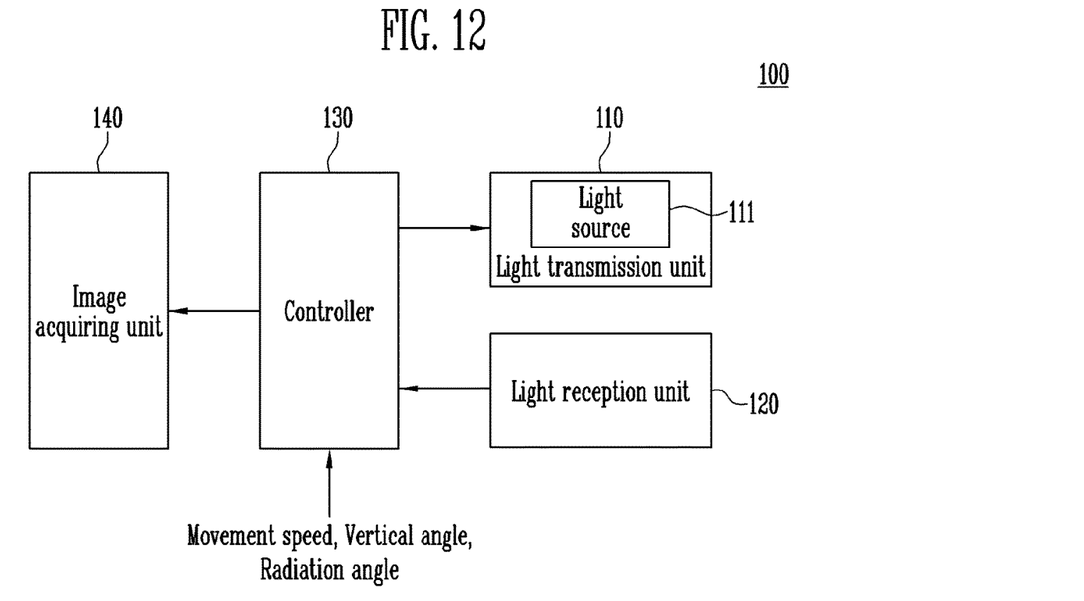
FIG. 12 is a diagram illustrating the laser radar apparatus according to the exemplary embodiment of the present invention.

FIG. 12 is a diagram illustrating the laser radar apparatus according to the exemplary embodiment of the present invention.

Referring to FIG. 12, the laser radar apparatus 100 includes the light transmission unit 110, the light reception unit 120, the controller 130, and the image acquiring unit 140.

The light transmission unit 110 may include a light source 111 outputting a laser pulse. A repetition rate of the laser pulse generated by the light source 111 is controlled under the control of the controller 130.

The light reception unit 120 receives a reflected and returning laser pulse. The light reception unit 120 outputs the received reflected laser pulse to the controller 130.

The controller 130 changes the repetition rate of the laser pulse output from the light source of the light transmission unit 110.

To this end, the controller 130 may acquire and receive various information. This will be described in more detail. The controller 130 may measure a reception intensity of the reflected laser pulse received through the light reception unit 120. Further, the controller 130 may make an initial laser pulse to be output through the light source, and measure a target distance to a target by using the reflected laser pulse received by the reception unit by the initial laser pulse. Further, the controller 130 may receive information about a movement speed, a vertical angle, a radiation angle, and the like from a separate memory, a GPS device, a movement body, and the like. Here, the movement body includes a vehicle and the like combined with the laser radar apparatus 100.

The controller 130 controls the light transmission unit 110 so that the repetition rate of the laser pulse is adjusted based on one or more parameters among parameters, such as reception power, the target distance, the movement speed, the vertical angle, and the radiation angle. Accordingly, the controller 130 may control the light transmission unit 110 so that the repetition rate of the laser pulse is adjusted by combining two or more parameters.

First, when the reception power is increased, the controller 130 increases the repetition rate of the laser pulse. Then, when the reception power is decreased, the controller 130 decreases the repetition rate of the laser pulse.

Second, when the target distance is shorter than a reference distance, the controller 130 increases the repetition rate of the laser pulse. Further, when the target distance is longer than the reference distance, the controller 130 decreases the repetition rate of the laser pulse.

Third, when the movement speed is smaller than a reference speed, the controller 130 increases the repetition rate of the laser pulse. Further, when the movement speed is larger than the reference speed, the controller 130 decreases the repetition rate of the laser pulse.

Fourth, when the vertical angle is larger than a reference angle, the controller 130 increases the repetition rate of the laser pulse. Further, when the vertical angle is smaller than the reference angle, the controller 130 decreases the repetition rate of the laser pulse.

Fifth, when the radiation angle output by the laser pulse is larger than a reference radiation angle, the controller 130 increases the repetition rate of the laser pulse. Further, when the radiation angle is smaller than the reference radiation angle, the controller 130 decreases the repetition rate of the laser pulse.

Accordingly, in the present invention, the controller 130 controls the repetition rate of the laser pulse in order to efficiently acquire an image in various environments.

The image acquiring unit 140 may acquire an image (for example, a 3D image) by using the reflected laser pulse received through the light reception unit 120. The image acquiring unit 140 may include a device for reproducing the acquired image, or output the image to a device for reproducing an image.

Figure 13:
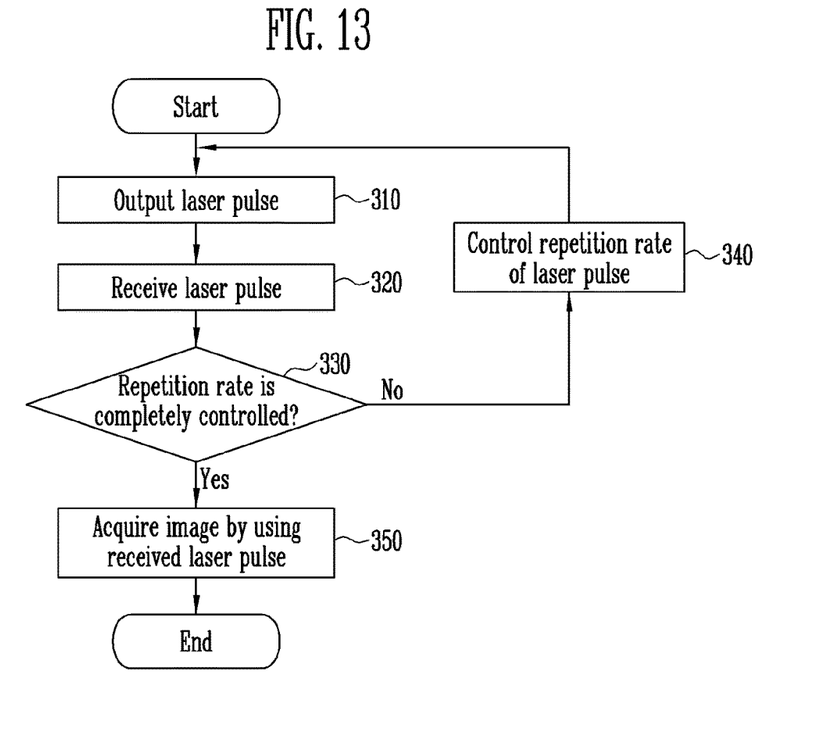
FIG. 13 is a flowchart illustrating an example of an operation of acquiring an image of the laser radar apparatus according to the exemplary embodiment of the present invention.

FIG. 13 is a flowchart illustrating an example of an operation of acquiring an image of the laser radar apparatus according to the exemplary embodiment of the present invention.

Referring to FIG. 13, the light transmission unit 110 outputs a laser pulse by using a light source (step 310).

The light reception unit 120 receives a reflected laser pulse by the laser pulse output from the light transmission unit 110. The light reception unit 120 outputs the received reflected laser pulse to the controller 130.

In the meantime, the controller 130 determines whether a repetition rate of the received laser pulse is completely controlled (step 330). In this case, the controller 130 may determine whether the control of the repetition rate of the laser pulse is necessary by using at least one of various parameters.

When the controller 130 determines that the repetition rate of the received laser pulse is completely controlled as a result of the determination of step 330, the operation proceeds to step 350. Unlikely, when the controller 130 determines that the repetition rate of the received laser pulse is not completely controlled as the result of the determination of step 330, the operation proceeds to step 340.

The 310 controls the repetition rate of the laser pulse output through the light transmission unit (step 340). Here, the operation of controlling the repetition rate of the laser pulse of the controller 130 has been described in detail with reference to FIG. 12, so that a detailed description thereof will be omitted herein.

In the meantime, the image acquiring unit 140 may acquire a 3D image by receiving the reflected laser pulse (step 350). In this case, the image acquiring unit 140 may receive the laser pulse from the controller 130.

Accordingly, in the present invention, the repetition rate of the laser pulse is changed by using a characteristic that when the repetition rate of the laser pulse is increased, the output of the pulse is decreased, and when the repetition rate of the laser pulse is decreased, the output of the pulse is increased. Accordingly, it is possible to improve efficiency in acquiring an image in various environments through adjustment of the repetition rate of the light source of the laser pulse.

The laser radar apparatus may acquire an optimum image by controlling a repetition rate of a laser pulse considering various environments, for example, various conditions and situations, such as a reception environment, a movement environment, an installation position, a light source characteristic.

As described above, the embodiment has been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:

1. A laser radar apparatus, comprising:
   a light transmission unit configured to output a laser pulse by using a light source;
   a light reception unit configured to receive a reflected laser pulse in connection with the laser pulse; and
   a controller configured to adjust a repetition rate of the laser pulse of the light source,
   wherein the controller adjusts the repetition rate of the laser pulse based on at least one of reception power, a target distance, a movement speed, a vertical angle, and a radiation angle,
   wherein the controller measures the reception power from the reflected laser pulse, and when the reception power is increased, the controller increases the repetition rate of the laser pulse, and when the reception power is decreased, the controller decreases the repetition rate of the laser pulse.

2. The laser radar apparatus of claim 1, wherein the controller changes the repetition rate of the laser pulse into one form between a linear change and a non-linear change, and the change is one of a continuous increase and a continuous decrease.

3. The laser radar apparatus of claim 1, wherein the controller changes the repetition rate of the laser pulse into one among repetition rates corresponding to a plurality of predetermined stages.

4. The laser radar apparatus of claim 1, wherein the controller outputs an initial laser pulse to a target, receives a laser pulse reflected from the target by the initial laser pulse, and measures the target distance.

5. The laser radar apparatus of claim 4, wherein when the target distance is shorter than a reference distance, the controller increases the repetition rate of the laser pulse, and when the target distance is longer than the reference distance, the controller decreases the repetition rate of the laser pulse.

6. A laser radar apparatus, comprising:
   a light transmission unit configured to output a laser pulse by using a light source;
   a light reception unit configured to receive a reflected laser pulse in connection with the laser pulse; and
   a controller configured to adjust a repetition rate of the laser pulse of the light source,
   wherein the controller adjusts the repetition rate of the laser pulse based on at least one of reception power, a target distance, a movement speed, a vertical angle, and a radiation angle, and
   wherein the controller receives the movement speed of a movement body to which the laser radar apparatus is attached.

7. The laser radar apparatus of claim 6, wherein when the movement speed is smaller than a reference speed, the controller increases the repetition rate of the laser pulse, and when the movement speed is larger than the reference speed, the controller decreases the repetition rate of the laser pulse.

8. The laser radar apparatus of claim 1, wherein the controller measures the vertical angle, at which the laser pulse is output, based on a horizontal axis corresponding to a height of a movement body to which the laser radar apparatus is attached.

9. The laser radar apparatus of claim 8, wherein when the vertical angle is larger than a reference angle, the controller increases the repetition rate of the laser pulse, and when the vertical angle is smaller than the reference angle, the controller decreases the repetition rate of the laser pulse.

10. The laser radar apparatus of claim 1, wherein when the radiation angle, at which the laser pulse is output, is larger than a reference radiation angle, the controller increases the repetition rate of the laser pulse, and when the radiation angle is larger than the reference radiation angle, the controller decreases the repetition rate of the laser pulse.

11. The laser radar apparatus of claim 1, further comprising:
an image acquiring unit configured to reproduce a 3D image by using the reflected laser pulse from the controller.

12. A method of acquiring an image of a laser radar apparatus, comprising:
outputting a laser pulse by using a light source;
receiving a reflected laser pulse in connection with the laser pulse; and
acquiring an image by using the reflected laser pulse,
wherein the outputting of the laser pulse includes adjusting a repetition rate of the laser pulse of the light source based on at least one of reception power, a target distance, a movement speed, a vertical angle, and a radiation angle, and
wherein the adjusting of the laser pulse includes:
measuring the reception power from the reflected laser pulse; and
when the reception power is larger than a reference power, increasing the repetition rate of the laser pulse, and when the reception power is smaller than the reference power, decreasing the repetition rate of the laser pulse.

13. The method of claim 12, wherein the adjusting of the laser pulse includes changing the repetition rate of the laser pulse into one form between a linear change and a non-linear change, and
the change is one of a continuous increase and a continuous decrease.

14. The method of claim 12, wherein the adjusting of the laser pulse includes changing the repetition rate of the laser pulse into one among repetition rates corresponding to a plurality of predetermined stages.

15. The method of claim 12, wherein the adjusting of the laser pulse includes:
outputting an initial laser pulse to a target;
receiving a laser pulse reflected from the target by the initial laser pulse, and measuring the target distance; and
when the target distance is shorter than a reference distance, increasing the repetition rate of the laser pulse, and when the target distance is longer than the reference distance, decreasing the repetition rate of the laser pulse.

16. The method of claim 12, wherein the adjusting of the laser pulse includes:
receiving the movement speed of a movement body to which the laser radar apparatus is attached; and
when the movement speed is smaller than a reference speed, increasing the repetition rate of the laser pulse, and when the movement speed is larger than the reference speed, decreasing the repetition rate of the laser pulse.

17. The method of claim 12, wherein the adjusting of the laser pulse includes:
measuring the vertical angle, at which the laser pulse is output, based on a horizontal axis corresponding to a height of a movement body to which the laser radar apparatus is attached; and
when the vertical angle is larger than a reference angle, increasing the repetition rate of the laser pulse, and when the vertical angle is smaller than the reference angle, decreasing the repetition rate of the laser pulse.

18. The method of claim 12, wherein the adjusting of the laser pulse includes:
when the radiation angle, at which the laser pulse is output, is larger than a reference radiation angle, increasing the repetition rate of the laser pulse, and when the radiation angle is larger than the reference radiation angle, decreasing the repetition rate of the laser pulse.

* * * * *